(12) United States Patent
Jaegal

(10) Patent No.: US 11,403,669 B2
(45) Date of Patent: Aug. 2, 2022

(54) VEHICULAR ADVERTISEMENT PROVIDING DEVICE AND VEHICULAR ADVERTISEMENT PROVIDING METHOD

(71) Applicant: LG Electronics Inc., Seoul (KR)

(72) Inventor: Chan Jaegal, Seoul (KR)

(73) Assignee: LG Electronics Inc., Seoul (KR)

( * ) Notice: Subject to any disclaimer, the term of this patent is extended or adjusted under 35 U.S.C. 154(b) by 346 days.

(21) Appl. No.: 16/500,716

(22) PCT Filed: Jul. 4, 2019

(86) PCT No.: PCT/KR2019/008209
§ 371 (c)(1),
(2) Date: Oct. 3, 2019

(87) PCT Pub. No.: WO2021/002519
PCT Pub. Date: Jan. 7, 2021

(65) Prior Publication Data
US 2020/0118172 A1    Apr. 16, 2020

(51) Int. Cl.
*G01C 22/00* (2006.01)
*G05D 1/00* (2006.01)
*G06Q 30/02* (2012.01)
*G06T 19/00* (2011.01)
*G06V 20/56* (2022.01)

(52) U.S. Cl.
CPC ....... *G06Q 30/0266* (2013.01); *G05D 1/0088* (2013.01); *G06T 19/006* (2013.01); *G06V 20/56* (2022.01)

(58) Field of Classification Search
CPC ............. G06Q 30/0266; G05D 1/0088; G06K 9/00791; G06T 19/006
USPC .......................................................... 701/23
See application file for complete search history.

(56) References Cited

U.S. PATENT DOCUMENTS

2018/0014182 A1 * 1/2018 Jaegal ..................... H04L 67/12
2018/0260638 A1 * 9/2018 Michalakis ......... G06F 16/2365

FOREIGN PATENT DOCUMENTS

JP          2005070231 A  *  3/2005

OTHER PUBLICATIONS

English Translation for JP2005070231A (Year: 2021).*

* cited by examiner

*Primary Examiner* — Mahmoud S Ismail
(74) *Attorney, Agent, or Firm* — Fish & Richardson P.C.

(57) ABSTRACT

Disclosed is a vehicular advertisement providing device including a processor configured to receive data generated by at least one server, to generate augmented reality (AR) advertisement data that matches the outside of a road in which a vehicle travels based on the data, and to provide a signal for displaying a graphic object based on the advertisement data on at least one display included in the vehicle. The vehicular advertisement providing device is included in an autonomous vehicle. The autonomous vehicle is associated with a robot. The vehicular advertisement providing device is implemented using an artificial intelligence (AI) algorithm.

18 Claims, 7 Drawing Sheets

VEHICULAR ADVERTISEMENT PROVIDING DEVICE AND VEHICULAR ADVERTISEMENT PROVIDING METHOD

CROSS-REFERENCE TO RELATED APPLICATIONS

This application is a National Stage application under 35 U.S.C. § 371 of International Application No. PCT/KR2019/008209, filed on Jul. 4, 2019. The disclosure of the prior application is incorporated by reference in its entirety.

TECHNICAL FIELD

The present invention relates to a vehicular advertisement providing device and a vehicular advertisement providing method.

BACKGROUND ART

A vehicle is an apparatus that is moved in a desired direction by a user who rides therein. A representative example of a vehicle is an automobile. An autonomous vehicle is a vehicle that autonomously travels without driving manipulation of a human. A user riding in an autonomous vehicle does not drive and thus is capable of doing other activity while the vehicle travels. For example, a user riding in an autonomous vehicle may watch an advertisement. There is a need for a method of maximizing an advertising effect in association with vehicle driving while an advertisement is provided.

DISCLOSURE

Technical Problem

It is an object of the present invention to provide a vehicular advertisement providing device and a vehicular advertisement providing method for outputting an augmented reality (AR) advertisement while a vehicle travels.

The technical problems solved by the embodiments are not limited to the above technical problems, and other technical problems which are not described herein will become apparent to those skilled in the art from the following description.

Technical Solution

In accordance with the present invention, the above and other objects can be accomplished by the provision of a vehicular advertisement providing device including a processor configured to receive data generated by at least one server, to generate augmented reality (AR) advertisement data that matches the outside of a road in which a vehicle travels based on the data, and to provide a signal for displaying a graphic object based on the advertisement data on at least one display included in the vehicle.

According to an embodiment of the present invention, the processor may provide a signal for displaying AR signage that matches the outside of the road in which the vehicle travels, to the at least one display, and may provide a signal for displaying the graphic object to the AR signage.

According to an embodiment of the present invention, the data generated by the at least one server may include information on a position that matches the AR signage, and the position may be one point of the outside of the road in which the vehicle travels.

According to an embodiment of the present invention, the data generated by the at least one server may include at least one of information on a size of the AR signage, information on a time of displaying the AR signage, information on a position of displaying the AR signage, or information on displayed content of the AR signage.

According to an embodiment of the present invention, the processor may provide a signal for displaying the AR signage to match an empty space of the outside of the road in which the vehicle travels or a structure, to the at least one display.

According to an embodiment of the present invention, the processor may acquire information on a user gaze and may provide a signal for displaying the AR signage at an intersection between the user gaze and the display in a state in which the user gaze is oriented toward the empty space or the structure.

According to an embodiment of the present invention, the processor may determine at least one of a display region of the graphic object, a size of the graphic object, content of the graphic object, or a user interface method related to an advertisement, based on driving situation information.

According to an embodiment of the present invention, the processor may receive information on an autonomous driving mode, and upon determining that the vehicle travels in an autonomous driving state, the processor may provide a signal for displaying the graphic object to be relatively large compared with a case in which the vehicle travels in a manual driving state.

According to an embodiment of the present invention, the processor may receive information on an autonomous driving mode, and upon determining that the vehicle travels in an autonomous driving state, the processor may provide a signal for displaying the graphic object in a different form from a case in which the vehicle travels in a manual driving state.

According to an embodiment of the present invention, the processor may receive information on an autonomous driving mode, and upon determining that the vehicle travels in an autonomous driving state, the processor may provide a signal for implementing a user interface using a different method from a case in which the vehicle travels in a manual driving state.

According to an embodiment of the present invention, the processor may receive user sensing data, may determine an interest rate of a user with respect to the graphic object based on the user sensing data, and may provide a signal for displaying a graphic object associated with the interest rate on the display.

According to an embodiment of the present invention, the processor may provide a signal for control of at least one of conversion to an autonomous driving mode, vehicle steering, acceleration, or deceleration of the vehicle, based on the interest rate.

According to an embodiment of the present invention, the processor may provide a signal for setting a destination associated with the advertisement data, based on the interest rate.

According to an embodiment of the present invention, the processor may provide a signal for outputting content associated with the advertisement data, based on the interest rate.

In another aspect of the present invention, a vehicular advertisement providing method includes receiving data generated by at least one server, by at least one processor, generating augmented reality (AR) advertisement data that matches the outside of a road in which a vehicle travels based on the data, by the at least one processor, and providing a signal for displaying a graphic object based on the advertisement data on at least one display included in the vehicle, by the at least one processor.

According to an embodiment of the present invention, the providing the signal may include providing a signal for displaying AR signage that matches the outside of the road in which the vehicle travels, to the at least one display, by the at least one processor, and providing a signal for displaying the graphic object to the AR signage, by the at least one processor.

According to an embodiment of the present invention, the data generated by the at least one server may include information on a position that matches the AR signage, and the position may be one point of the outside of the road in which the vehicle travels.

According to an embodiment of the present invention, the data generated by the at least one server may include at least one of information on a size of the AR signage, information on a time of displaying the AR signage, information on a position of displaying the AR signage, or information on displayed content of the AR signage.

According to an embodiment of the present invention, the providing the signal may include providing a signal for displaying the AR signage to match an empty space of the outside of the road in which the vehicle travels or a structure, to the at least one display, by the at least one processor.

According to an embodiment of the present invention, the providing the signal may include acquiring information on a user gaze, by the at least one processor, and providing a signal for displaying the AR signage at an intersection between the user gaze and the display in a state in which the user gaze is oriented toward the empty space or the structure, by the at least one processor.

Details of other embodiments are included in a detailed description and drawings.

Advantageous Effects

According to the above technical solution, the present invention may provide one or more of the following effects.

First, it may not be required to install a physical outdoor billboard, and thus there is no limit in a space/cost, etc. while an advertisement is provided.

Second, it may be very easy to change and update advertised information.

Third, an advertisement appropriate for each user preference and a customized advertisement may be provided.

Fourth, an advertisement for enabling an interaction such as purchase or further knowledge through multi-modality may be provided.

Fifth, an advertising effect may be maximized.

The effects of the present invention are not limited to the above-described effects and other effects which are not described herein may be derived by those skilled in the art from the following description of the embodiments of the disclosure.

BEST MODE

Reference will now be made in detail to the exemplary embodiments of the present invention, examples of which are illustrated in the accompanying drawings. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

It will be understood that, although the terms "first", "second", "third" etc. may be used herein to describe various elements, these elements should not be limited by these terms. These terms are only used to distinguish one element from another element.

It will be understood that when an element is referred to as being "on", "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements present.

The singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

Figure 1:
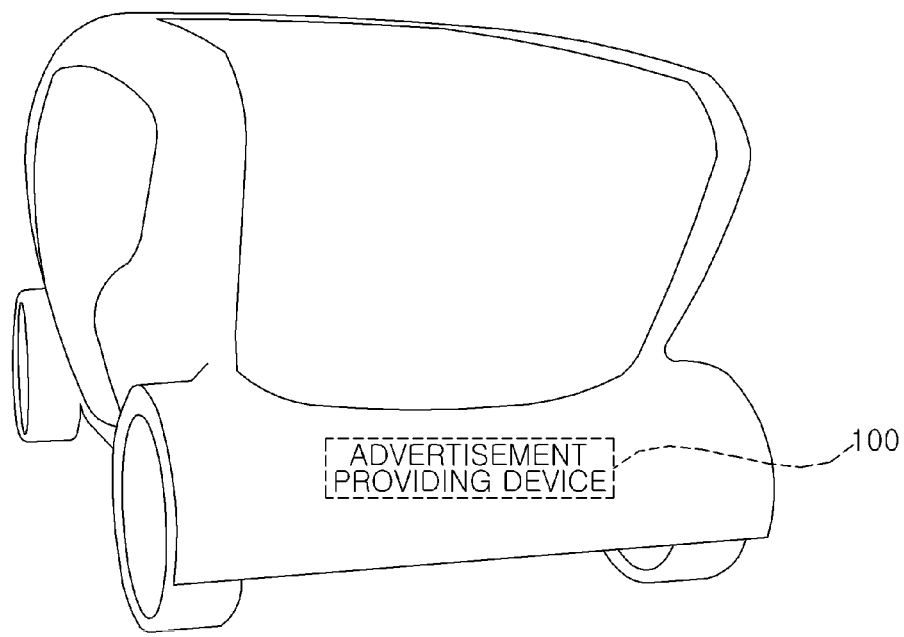
FIG. 1 is a diagram showing an outer appearance of a vehicle according to an embodiment of the present invention.
Figure 1:
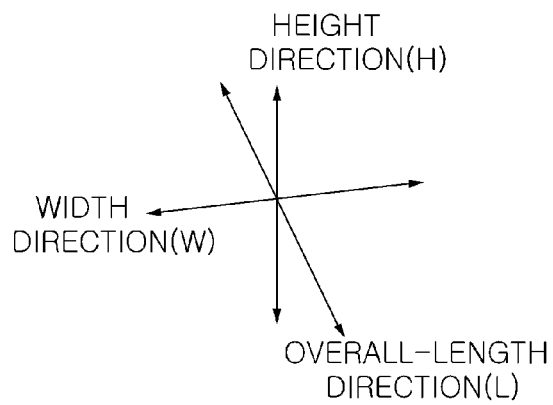

FIG. 1 is a diagram showing a vehicle according to an embodiment of the present invention.

Referring to FIG. 1, a vehicle 10 according to an embodiment of the present invention may be defined as a transportation device that travels on a road or a railroad. The vehicle 10 may conceptually include an automobile, a train, and a motorcycle. The vehicle 10 may include a vehicle equipped with an internal combustion engine as a power source, a hybrid vehicle equipped with both an engine and an electric motor as a power source, and an electric vehicle equipped with an electric motor as a power source. The vehicle 10 may be a sharing vehicle. The vehicle 10 may be an autonomous vehicle. The vehicle 10 may include an advertisement providing device 100.

The vehicle 10 may interact with at least one robot. The robot may be an autonomous mobile robot (AMR) that autonomously travels. The AMR is autonomously moveable and freely moves, and includes a plurality of sensors for avoiding an obstacle or the like while traveling. The AMR may be a flight type robot (e.g., a drone) including a flight device. The AMR may be a wheel type robot that includes at least one wheel and moves via rotation of the wheel. The AMR may be a leg type robot that includes at least one leg and moves using the leg.

A robot may function as a device for providing convenience of a user of the vehicle 10. For example, the robot may move a load on the vehicle 10 to a final destination of a user. For example, the robot may guide a road to a final destination to the user who exits from the vehicle 10. For example, the robot may transfer a user who exits from the vehicle 10 to a final destination.

At least one electronic device included in a vehicle may communicate with a robot through a communication device 220.

At least one electronic device included in a vehicle may provide, to the robot, data processed by at least one electronic device included in the vehicle. For example, the at least one electronic device included in the vehicle may provide, to the robot, at least one of object data, HD map data, vehicle state data, vehicle position data, or driving plan data.

The at least one electronic device included in the vehicle may receive data processed by the robot, from the robot. The at least one electronic device included in the vehicle may receive at least one of sensing data generated by the robot, object data, robot state data, robot position data, or robot moving plan data.

The at least one electronic device included in the vehicle may generate a control signal in further consideration of the data received from the robot. For example, the at least one electronic device included in the vehicle may compare information on an object generated by an object detection device 210 with information on an object generated by a robot and may generate a control signal based on the comparison result. The at least one electronic device included in the vehicle may generate a control signal to prevent interference between a moving route of the vehicle 10 and a moving route of the robot.

The at least one electronic device included in the vehicle may include a software module or a hardware module (hereinafter, an AI module) which implements artificial intelligence (AI). The at least one electronic device included in the vehicle may input the acquired data to the AI module and may use data output from the AI module.

The AI module may perform machine learning on input data using at least one artificial neural network (ANN). The AI module may output the driving plan data by performing machine learning on the input data.

The at least one electronic device included in the vehicle may generate a control signal based on the data output from the AI module.

In some embodiments, the at least one electronic device included in the vehicle may receive data processed by AI from an external device through the communication device 220. The at least one electronic device included in the vehicle may generate a control signal based on the data processed by AI.

Figure 2:
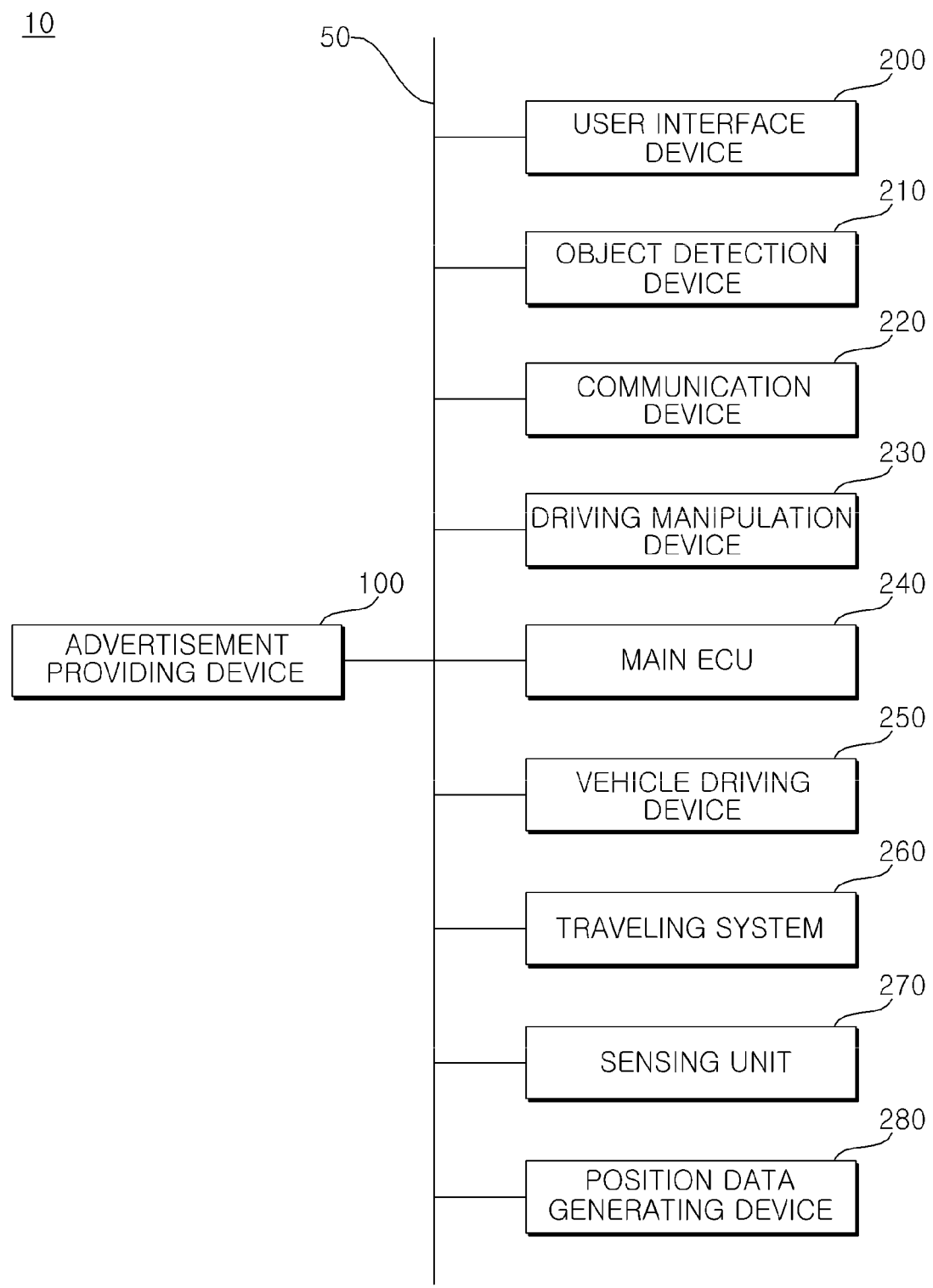
FIG. 2 is a control block diagram of a vehicle according to an embodiment of the present invention.

FIG. 2 is a control block diagram of a vehicle according to an embodiment of the present invention Referring to FIG. 2, the vehicle 10 may include the vehicular advertisement providing device 100, a user interface device 200, an object detection device 210, a communication device 220, a driving manipulation device 230, a main electronic control unit (ECU) 240, a vehicle driving device 250, a traveling system 260, a sensing unit 270, and a position data generating device 280.

The vehicular advertisement providing device 100 may generate advertisement data based on data provided by at least one server. The vehicular advertisement providing device 100 may provide a signal for displaying a graphic object based on the advertisement data on at least display included in the vehicle 10. In this specification, although an embodiment in which the vehicular advertisement providing device 100 is included in the vehicle 10 has been described, the vehicular advertisement providing device 100 may be disposed outside the vehicle 10. In this case, the vehicular advertisement providing device 100 may provide a signal, data, or information to the vehicle 10 through a wireless communication method.

The UI device 200 may be used to enable the vehicle 10 to communicate with a user. The UI device 200 may receive user input, and may provide information generated by the vehicle 10 to the user. The vehicle 10 may implement a UI or User Experience (UX) through the UI device 200. The user interface device 200 may be implemented as a display device installed in the vehicle 10, a head up display (HUD) device, a window display device, a cluster device, or the like. The user interface device 200 may include an input device, an output device, and a user monitoring device. The user interface device 200 may include an input device such as a touch input device, a mechanical input device, a voice input device, or a gesture input device. The user interface device 200 may include an output device such as a speaker, a display, or a haptic module. The user interface device 200 may include a user monitoring device such as a driver monitoring system (DMS) or an internal monitoring system (IMS).

The object detection device 210 may detect an object outside the vehicle 10. The object detection device 210 may include at least one sensor for detecting an object outside the vehicle 10. The object detection device 210 may include at least one of a camera, radio detecting and ranging (radar), light detection and ranging (LiDAR), an ultrasonic sensor, or an infrared sensor. The object detection device 210 may provide data of an object, which is generated based on a sensing signal generated by a sensor, to at least one electronic device included in a vehicle.

The communication device 220 may exchange a signal with a device positioned outside the vehicle 10. The communication device 220 may exchange a signal with at least one of an infrastructure element (e.g., a server or a broadcasting station) or other vehicles. The communication device 220 may include at least one of a transmission antenna, a reception antenna, a radio frequency (RF) circuit for implementing various communication protocols, or an RF device for performing communication.

The communication device 220 may communicate with a device outside the vehicle 10 using a 5G (e.g., a new radio (NR)) method. The communication device 220 may implement V2X (V2V, V2D, V2P, and V2N) communication using the 5G method.

The driving manipulation device 230 may be used to receive a user command for driving the vehicle 10. In the manual mode, the vehicle 10 may travel based on a signal provided by the driving manipulation device 230. The driving manipulation device 230 may include a steering input device (e.g., a steering wheel), an acceleration input device (e.g., an acceleration pedal), and a brake input device (e.g., a brake pedal).

The main ECU 240 may control an overall operation of at least one electronic device included inside the vehicle 10.

The vehicle driving device 250 may be a device that electrically controls various vehicle driving devices in the vehicle 10. The vehicle driving device 250 may include a power train driving control device, a chassis driving control device, a door/window driving control device, a safety device driving control device, a lamp driving control device, and an air conditioner driving control device. The power train driving control device may include a power source driving control device and a transmission driving control device. The chassis driving control device may include a steering driving control device, a brake driving control device, and a suspension driving control device.

The safety device driving control device may include a safety belt driving control device for control of safety belt.

The vehicle driving device 250 may also be referred to as a control electronic control unit (ECU).

A traveling system 260 may generate a signal for controlling the movement of the vehicle 10 or for outputting information to a user, based on the data of the object, which is received from the object detection device 210. The traveling system 260 may provide the generated signal to at least one of the user interface device 200, the main ECU 240, or the vehicle driving device 250.

The traveling system 260 may conceptually include an advanced driver assistance system (ADAS). The ADAS 260 may implement at least one of an adaptive cruise control (ACC) system, an autonomous emergency braking (AEB) system, a forward collision warning (FCW) system, a lane keeping assist (LKA) system, a lane change assist (LCA) system, a target following assist (TFA) system, a blind spot detection (BSD) system, a high beam assist (HBA) system, an auto parking system (APS), a PD collision warning system, a traffic sign recognition (TSR) system, a traffic sign assist (TSA) system, a night vision (NV) system, a driver status monitoring (DSM) system, or a traffic jam assist (TJA) system.

The traveling system 260 may include autonomous driving electronic control unit (ECU). The autonomous driving ECU may set an autonomous driving route based on data received from at least one of other electronic devices in the vehicle 10. The autonomous driving ECU may set an autonomous driving route based on data received from at least one of the user interface device 200, the object detection device 210, the communication device 220, the sensing unit 270, or the position data generating device 280. The autonomous driving ECU may generate a control signal to enable the vehicle 10 to travel along an autonomous driving route. The control signal generated by the autonomous driving ECU may be provided to at least one of the main ECU 240 or the vehicle driving device 250.

The sensing unit 270 may sense a vehicle state. The sensing unit 270 may include at least one of an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tire sensor, a steering sensor for rotation of the steering wheel, an in-vehicle temperature sensor, an in-vehicle humidity sensor, an ultrasonic sensor, an illuminance sensor, an acceleration pedal position sensor, or a brake pedal position sensor. The inertial navigation unit (IMU) sensor may include one or more of an acceleration sensor, a gyro sensor, and a magnetic sensor.

The sensing unit 270 may generate state data of a vehicle based on a signal generated by at least one sensor. The sensing unit 270 may acquire a sensing signal of vehicle position information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, the pressure applied to an accelerator pedal, the pressure applied to a brake pedal, and so on.

The sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 270 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The sensing unit may include a tension sensor. The tension sensor may generate a sensing signal based on a tension state of a safety belt.

The position data generating device 280 may generate position data of the vehicle 10. The position data generating device 280 may include at least one of a global positioning system (GPS) or a differential global positioning system (DGPS). The position data generating device 280 may generate position data of the vehicle 10 based on a signal generated by at least one of a GPS or a DGPS. In some embodiments, the position data generating device 280 may correct the position data based on at least one of an inertial measurement unit (IMU) of the sensing unit 270 or a camera of the object detection device 210.

The position data generating device 280 may be referred to as a position displacement device. The position data generating device 280 may be referred to as a global navigation satellite system (GNSS).

The vehicle 10 may include an internal communication system 50. A plurality of electronic devices included in the vehicle 10 may exchange signals using the internal communication system 50 as a medium. The signals may include data. The internal communication system 50 may use at least one communication protocol (e.g., CAN, LIN, FlexRay, MOST, or Ethernet).

Figure 3:
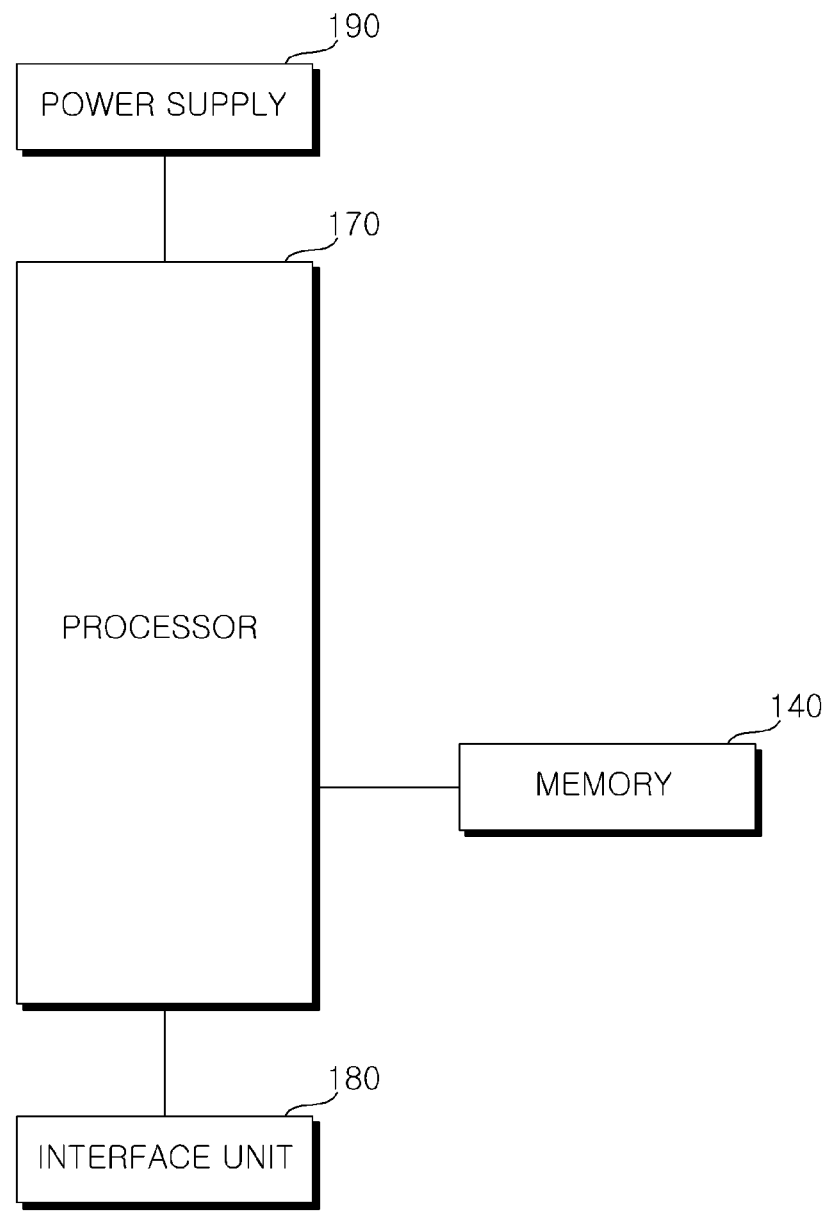
FIG. 3 is a control block diagram of a vehicular electronic device according to an embodiment of the present invention.

FIG. 3 is a control block diagram of a vehicular electronic device according to an embodiment of the present invention.

Referring to FIG. 3, the advertisement providing device 100 may include a memory 140, a processor 170, an interface unit 180, and a power supply 190.

The memory 140 may be electrically connected to the processor 170. The memory 140 may store basic data of a predetermined unit, control data for control of an operation of a predetermined unit, and input and output data. The memory 140 may store data processed by the processor 170. The memory 140 may include at least one of a read-only memory (ROM), random-access memory (RAM), erasable programmable read only memory (EPROM), flash drive, or hard drive in terms of hardware. The memory 140 may store various data for an overall operation of the advertisement providing device 100, such as a program for processing or controlling the processor 170. The memory 140 may be integrated into the processor 170. In some embodiments, the memory 140 may be classified as a lower-ranking component of the processor 170.

The interface unit 180 may exchange signals with the at least one electronic device included in the vehicle 10 in a wired or wireless manner. The interface unit 180 may exchange signals with at least one of the user interface device 200, the object detection device 210, the communication device 220, the driving manipulation device 230, the main ECU 240, the vehicle driving device 250, the traveling system 260, the sensing unit 270, or the position data generating device 280 in a wired or wireless manner. The interface unit 180 may configure at least one of a communication module, a terminal, a pin, a cable, a port, a circuit, an element, or a device.

The interface unit 180 may exchange a signal in a wired or wireless manner with at least one electronic device included in the vehicle 10. The interface unit 180 may exchange a signal in a wired or wireless manner with at least one of the user interface device 200, the object detection device 210, the communication device 220, the driving manipulation device 230, the main ECU 240, the vehicle driving device 250, the traveling system 260, the sensing unit 270 or the position data generating device 280. The interface unit 180 may include at least one of a communication module, a terminal, a pin, a cable, a port, a circuit, an element, or a device.

The power supply 190 may supply power to the advertisement providing device 100. The power supply 190 may receive power from a power source (e.g., a battery) included in the vehicle 10 and may supply power to each unit of the advertisement providing device 100. The power supply 190 may be operated according to a control signal provided from the main ECU 240. The power supply 190 may be embodied as a switched-mode power supply (SMPS).

The processor 170 may be electrically connected to the memory 140, the interface unit 180, and the power supply 190 and may exchange a signal therewith. The processor 170 may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing other functions.

The processor 170 may be driven by power supplied from the power supply 190. The processor 170 may receive data, may process the data, may generate a signal, and may provide a signal in a state in which power is supplied by the power supply 190.

The processor 170 may receive information from other electronic devices within the vehicle 10 through the interface unit 180. The processor 170 may provide a control signal to other electronic devices within the vehicle 10 through the interface unit 180.

The processor 170 may receive data generated from at least one server. The server may generate advertisement related data and may provide the data to the vehicle 10. The communication device 220 may receive the advertisement related data from the server and may transmit the data to the vehicular advertisement providing device. The processor 170 may receive data generated from at least one sever through the communication device 220. The data generated by at least one server may include information on a position that matches augmented reality (AR) signage. Here, the position may be one point outside a road in which the vehicle 10 travels. The data generated by the at least one server may include at least one of information on a size of AR signage, information on a time of displaying the AR signage, information on a position of displaying the AR signage, or information on displayed content of the AR signage. The information on the position of displaying the AR signage may be a displayed position on a display.

The processor 170 may generate augmented reality (AR) advertisement data that matches the outside of the road in which the vehicle 10 travels, based on the data. The processor 170 may generate the AR advertisement data that matches a space or structure positioned outside the driving road. The structure may be an object positioned around the road and fixed to the ground. For example, the structure may include at least one of a street lamp, a street tree, a building, a telegraph pole, a traffic light, a bridge, a curb, or a building.

The processor 170 may provide a signal for displaying a graphic object based on the advertisement data on at least one display included in the vehicle 10. The display may display an AR graphic object based on the AR advertisement data, based on a signal provided to the display. For example, when a HUD is implemented using a method of projecting a graphic object to a wind shield, the display may display the graphic object at an interaction between a gaze oriented toward the outside of the road and the windshield. As such, the display may display the AR graphic object based on the AR advertisement data. For example, the AR graphic object may include AR signage. For example, the AR graphic object may include the AR signage and a graphic object displayed on the AR signage.

The processor 170 may display a signal for displaying AR signage that matches the outside of the driving road, on at least one display. The AR signage may be described as an imaginary billboard that matches a space or structure outside the travel road. The processor 170 may provide a signal for displaying the AR signage that matches an empty space outside the road in which the vehicle 10 travels or structure, to at least one display.

The processor 170 may provide a signal for displaying a graphic object on the AR signage. The display may display the AR signage and may display the graphic object on the AR signage. Accordingly, a user may sense as if an outdoor advertising signboard is installed.

The processor 170 may acquire information on a user gaze. The processor 170 may acquire information on the user gaze from a user monitoring device of the user interface device 200.

The processor 170 may provide a signal for displaying the AR signature at an intersection between the user gaze and the display in a state in which the user gaze is oriented toward an empty space or a structure.

The processor 170 may receive driving situation information from other electronic devices in the vehicle 10. The processor 170 may receive driving situation information from at least one of the user interface device 200, the object detection device 210, the communication device 220, the main ECU 240, the sensing unit 270, or the position data generating device 280. The driving situation information may include at least one of information on a driving mode of the vehicle 10, information on a driving state of the vehicle 10, information on a driving environment of the vehicle 10, or information on a user state. The information on the driving mode may include information on whether a driving mode is an autonomous driving mode or a manual driving mode. The information on the driving state of the vehicle 10 may include at least one of speed information, direction information, acceleration information, or location information of the vehicle 10. The information on the driving environment of the vehicle 10 may include information on whether a section in which a vehicle travels or is supposed to travel corresponds to at least one of a curve, an uphill road, a downhill road, an expressway, a city street, an intersection, a crosswalk, an onramp, or an off-ramp. The information on the user state may include information on an interest rate of output advertising content.

The processor 170 may determine at least one of a display region of a graphic object, a size of the graphic object, content of the graphic object, or a user interface method related to an advertisement, based on the driving situation information. The processor 170 may determine at least one of a display region of AR signage, a size of the AR signage, or information displayed on the AR signage, based on the driving situation information. The processor 170 may select any one of voice input, gesture input, touch input, and mechanical input, as a user interface method related to an advertisement, based on the driving situation information.

The processor 170 may receive information on the autonomous driving mode. For example, the processor 170 may receive information on the autonomous driving mode from at least one of the user interface device 200, the main ECU 240, or the traveling system 260.

Upon determining that the vehicle 10 travels in an autonomous driving state, the processor 170 may provide a signal for displaying a graphic object to be relatively large compared with the case in which the vehicle 10 travels in a manual driving state.

Upon determining that the vehicle 10 travels in an autonomous driving state, the processor 170 may provide a signal for displaying a graphic object in a different form from the case in which the vehicle 10 travels in a manual driving state.

Upon determining that the vehicle 10 travels in an autonomous driving state, the processor 170 may provide a signal for implementing a user interface using a different method from the case in which the vehicle 10 travels in a manual driving state.

The processor 170 may receive user sensing data. For example, the processor 170 may receive the user sensing data from an internal camera included in the user interface device 200. The user sensing data may include image data.

The processor 170 may determine an interest rate of a user with respect to a graphic object, based on the user sensing data. The interest rate of the user may be determined via a reaction of a user who looks at the graphic object. For example, upon detecting a gesture of a user who looks at the graphic object based on the image data, the processor 170 may determine the interest rate to be high. For example, upon detecting a gesture of manipulating an interface related to the graphic object based on the image data, the processor 170 may determine the interest rate to be high. For example, upon detecting a gesture of a user who looks at another side other than the graphic object based on the image data, the processor 170 may determine the interest rate to be low. For example, upon detecting that a gesture of a user who sleeps based on the image data, the processor 170 may determine the interest rate to be low.

The processor 170 may provide a signal for displaying a graphic object associated with the interest rate on a display. The graphic object associated with the interest rate may be a graphic object including relatively detailed information. For example, upon determining the interest rate of the user to be high in a state in which a first graphic object of product advertising is displayed, the processor 170 may display a second graphic object of detailed information of a product.

The processor 170 may provide a signal for control of at least one of conversion to an autonomous driving mode, vehicle steering, acceleration, or deceleration of the vehicle, based on the interest rate of the user. For example, upon determining the interest rate of the user with respect to the graphic object to be high in a state in which the vehicle 10 travels in a manual driving mode, the processor 170 may provide a signal for converting a driving mode to an autonomous driving mode. For example, upon determining that the interest rate of the user with respect to the graphic object to be high in a state in which the vehicle 10 travels at a first speed value, the processor 170 may provide a signal for enabling the vehicle 10 to travel at a lower second speed value than the first speed value. For example, upon determining that the interest rate of the user with respect to the graphic object to be high in a state in which the vehicle 10 travels in a lane, the processor 170 may provide a signal for enabling the vehicle 10 to move to a shoulder.

The processor 170 may provide a signal for setting a destination related to advertisement data based on the interest rate of the user. For example, upon determining the interest rate of the user with respect to the graphic object that matches a specific place to be high, the processor 170 may provide a signal for setting the specific place to a destination.

The processor 170 may provide a signal for outputting content associated with the advertisement data based on the interest of the user. For example, upon determining the interest rate of the user with respect to the graphic object that matches entertainment content to be high, the processor 170 may provide a signal for outputting the entertainment content.

The advertisement providing device 100 may include at least one printed circuit board (PCB). The memory 140, the interface unit 180, the power supply 190, and the processor 170 may be electrically connected to the PCB.

In some embodiments, the vehicular advertisement providing device 100 may further include a display. As described above, the display may display an AR graphic object based on the AR advertisement data, based on a signal provided from the processor 170.

Figure 4:
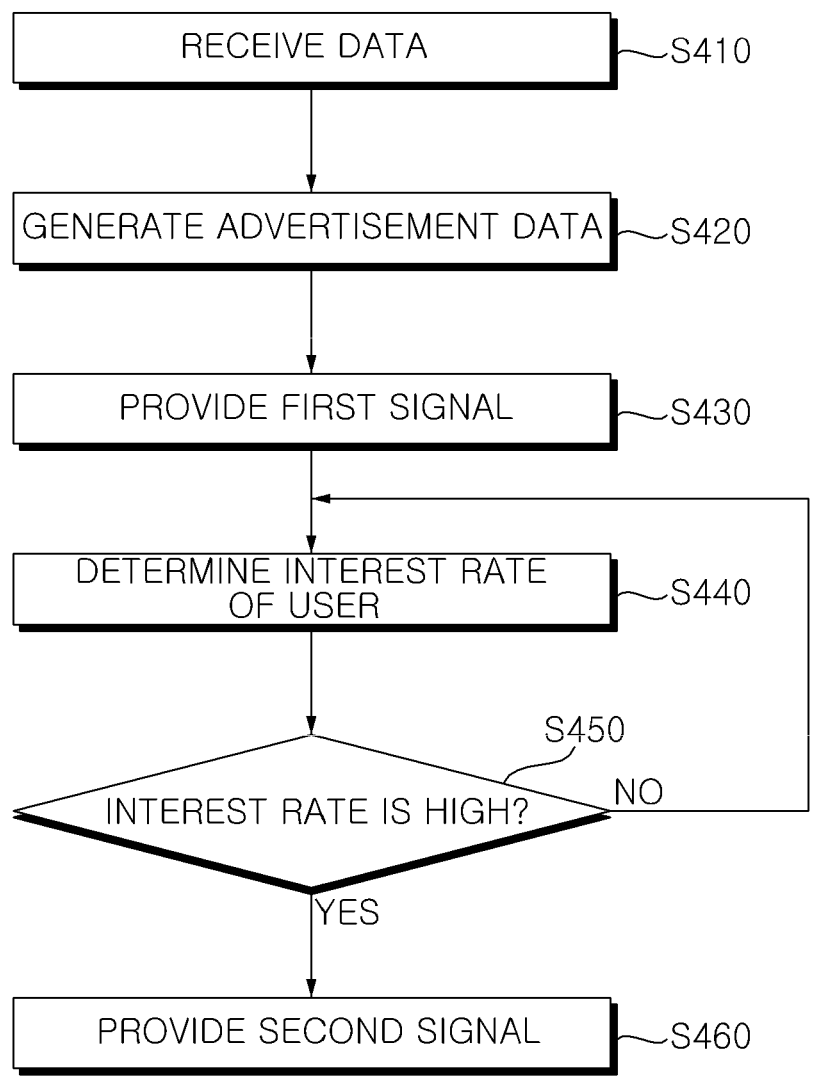
FIG. 4 is a flowchart of an advertisement providing device according to an embodiment of the present invention.

FIG. 4 is a flowchart of an advertisement providing device according to an embodiment of the present invention.

Referring to FIG. 4, the processor 170 may receive data generated by at least one server (S410). The data generated by the at least one server may include information on a position that matches AR signage. Here, the position may be one point of the outside of the road on which the vehicle 10 travels. The data generated by the at least one server may include at least one of information on a size of AR signage, information of a time of displaying the AR signage, information on a display position of the AR signage, or displayed information of the AR signage.

The processor 170 may generate augmented reality (AR) advertisement data that matches the outside of the road in which the vehicle 10 travels, based on the data (S420).

The processor 170 may provide a first signal for displaying a graphic object based on the advertisement data on at least one display included in the vehicle 10 (S430).

Operation S430 of providing the signal may include an operation in which the at least one processor 170 provides a signal for displaying AR signage matching the outside of the road in which the vehicle 10 travels on at least one display, and an operation in which the at least one processor 170 provides a signal for displaying a graphic object on the AR signage.

Operation S430 of providing the signal may include an operation in which the at least one processor 170 provides a signal for providing a signal for displaying AR signage that matches an empty space outside the road in which the vehicle 10 travels or structure, to at least one display.

Operation S430 of providing the signal may include an operation in which the at least one processor 170 acquires information on a user gaze and an operation in which the at least one processor 170 provides a signal for displaying the AR signage at an intersection between the user gaze and the display in a state in which the user gaze is oriented toward an empty space or a structure.

Operation S430 of providing the signal may include an operation in which the at least one processor 170 receives driving situation information and an operation in which the at least one processor 170 determines at least one of a display region of a graphic object, a size of the graphic object, content of the graphic object, or a user interface method related to an advertisement, based on the.

The operation of receiving the driving situation information may include an operation of receiving information on the autonomous driving mode.

Operation S430 of providing the signal may include an operation in which the at least one processor 170 provides a signal for displaying a graphic object to be relatively large compared with the case in which the vehicle 10 travels in a manual driving state upon determining that the vehicle 10 travels in an autonomous driving state.

Operation S430 of providing the signal may include an operation in which the at least one processor 170 provides a signal for displaying a graphic object in a different form from the case in which the vehicle 10 travels in a manual driving state upon determining that the vehicle 10 travels in an autonomous driving state.

Operation S430 of providing the signal may include an operation in which the at least one processor 170 provides a signal for implementing a user interface using a different method from the case in which the vehicle 10 travels in a manual driving state upon determining that the vehicle 10 travels in an autonomous driving state.

The processor 170 may determine an interest rate of a user with respect to the displayed graphic object (S440). Operation S440 of determining the interest rate may include an operation in which the at least one processor 170 receives user sensing data and an operation in which the at least one processor 170 determines an interest rate of a user with respect to the graphic object based on the user sensing data.

Upon determining that the interest rate is high (S450), the processor 170 may provide a second signal for displaying a graphic object associated with the interest rate on a display (S460).

Operation S460 of providing the second signal may include an operation in which the at least one processor 170 provides a signal for control of at least one of conversion to an autonomous driving mode, vehicle steering, acceleration, or deceleration of the vehicle 10, based on the interest rate of the user.

Operation S460 of providing the second signal may include an operation in which the at least one processor 170 provides a signal for setting a destination related to advertisement data based on the interest rate of the user.

Operation S460 of providing the second signal may include an operation in which the at least one processor 170 provides a signal for outputting content associated with the advertisement data based on the interest of the user.

Figure 5:
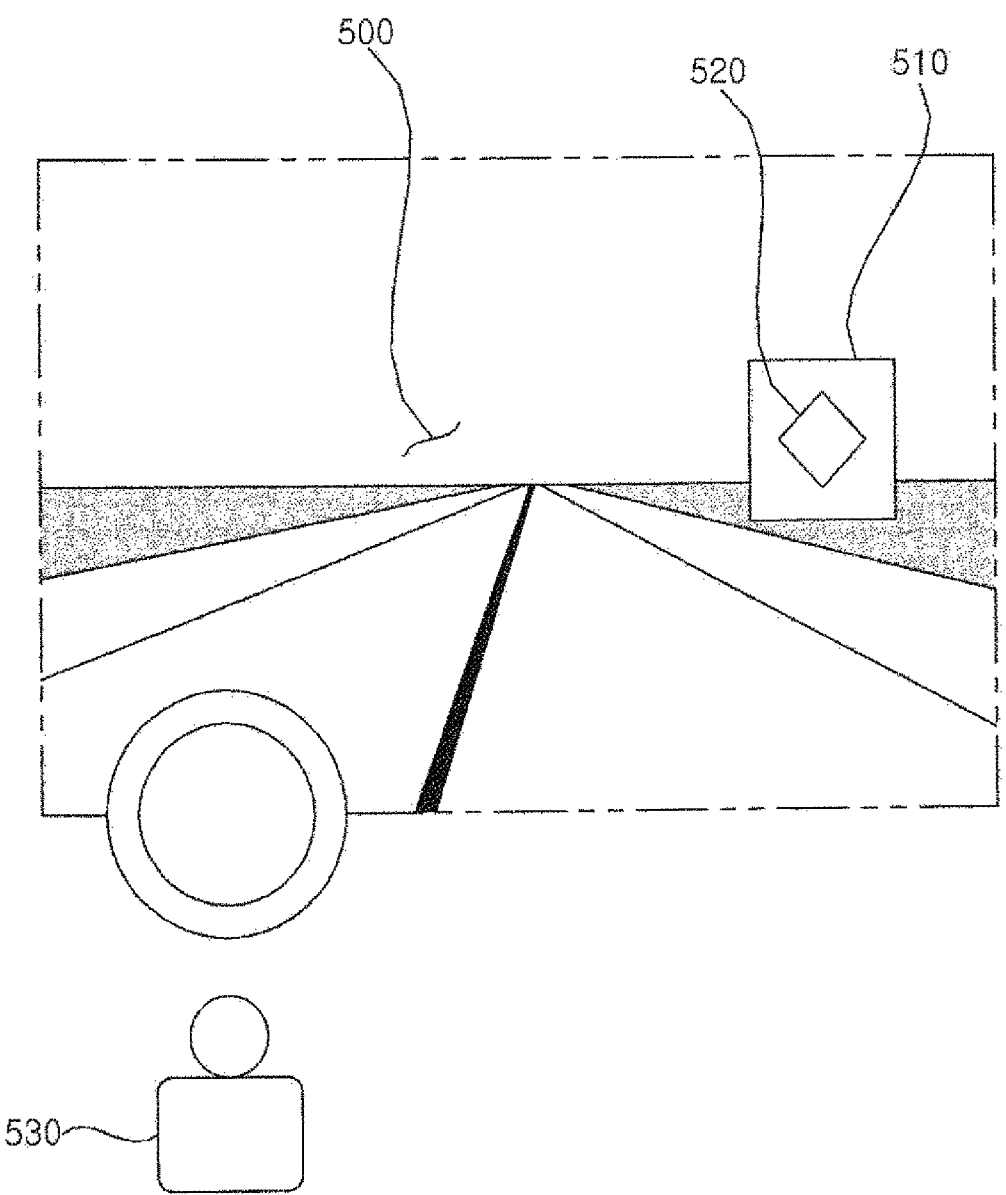
FIGS. 5 and 6 are diagrams for explanation of an operation of outputting an advertisement according to an embodiment of the present invention.
Figure 6:
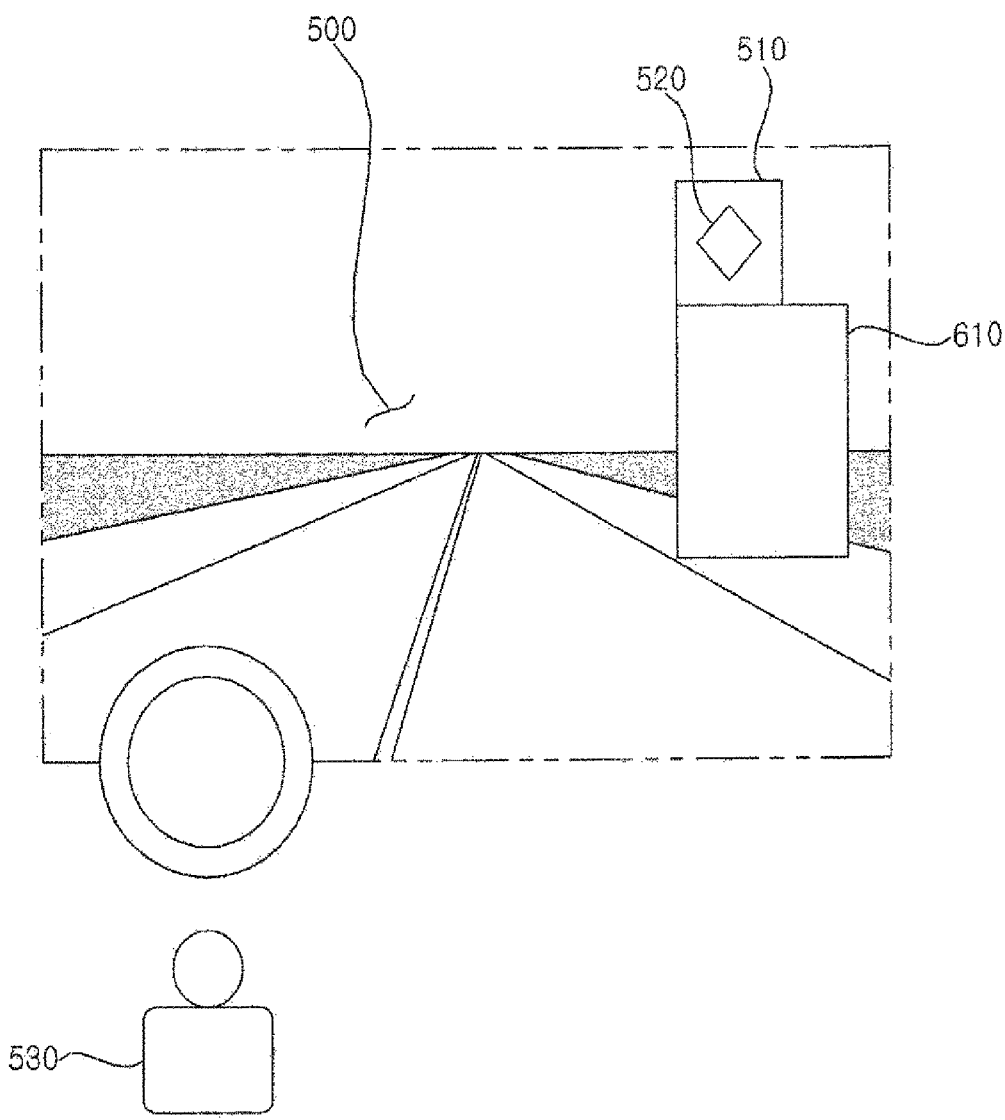

FIGS. 5 and 6 are diagrams for explanation of an operation of outputting an advertisement according to an embodiment of the present invention.

Referring to FIGS. 5 and 6, the vehicle 10 may include at least one display 500. The at least one display 500 may be classified as a lower-ranking component of the vehicular advertisement providing device 100. The at least one display 500 may include a HUD using a windshield.

The display 500 may receive a signal from the vehicular advertisement providing device 100. The display 500 may display the graphic object based on the received signal. The display 500 may display an AR graphic object that matches the outside of the road in which the vehicle 10 travels.

As exemplified in FIG. 5, the display 500 may display AR signage 510 in a space positioned outside the travel road. When an imaginary line is connected between an eye of a user 530 and the space outside the road, the display 500 may display the AR signage 510 at an intersection between the imaginary line and the windshield.

The AR signage 510 matches the specific space, and thus when the vehicle 10 moves forward, the AR signage 510 may be seen to move in a relatively backward direction from a point of view of the user 530.

As exemplified in FIG. 6, the display 500 may display the AR signage 510 in the vicinity of a structure 610 positioned outside the travel road. For example, the display 500 may display the AR signage 510 in such a way that the structure 610 and at least a portion of the AR signage 510 overlap each other. For example, the display 500 may display the AR signage 510 above, on the left, or on the right of the structure 610.

When an imaginary line is connected between an eye of the user 530 and the structure 610, the display 500 may display the AR signage 510 at an intersection between the imaginary line and the windshield.

The AR signage 510 matches the specific space, and thus when the vehicle 10 moves forward, the AR signage 510 may be seen to move in a relatively backward direction with the structure 610 from a point of view of the user 530.

The display 500 may display a graphic object 520 based on advertisement data on the AR signage 510.

Figure 7:
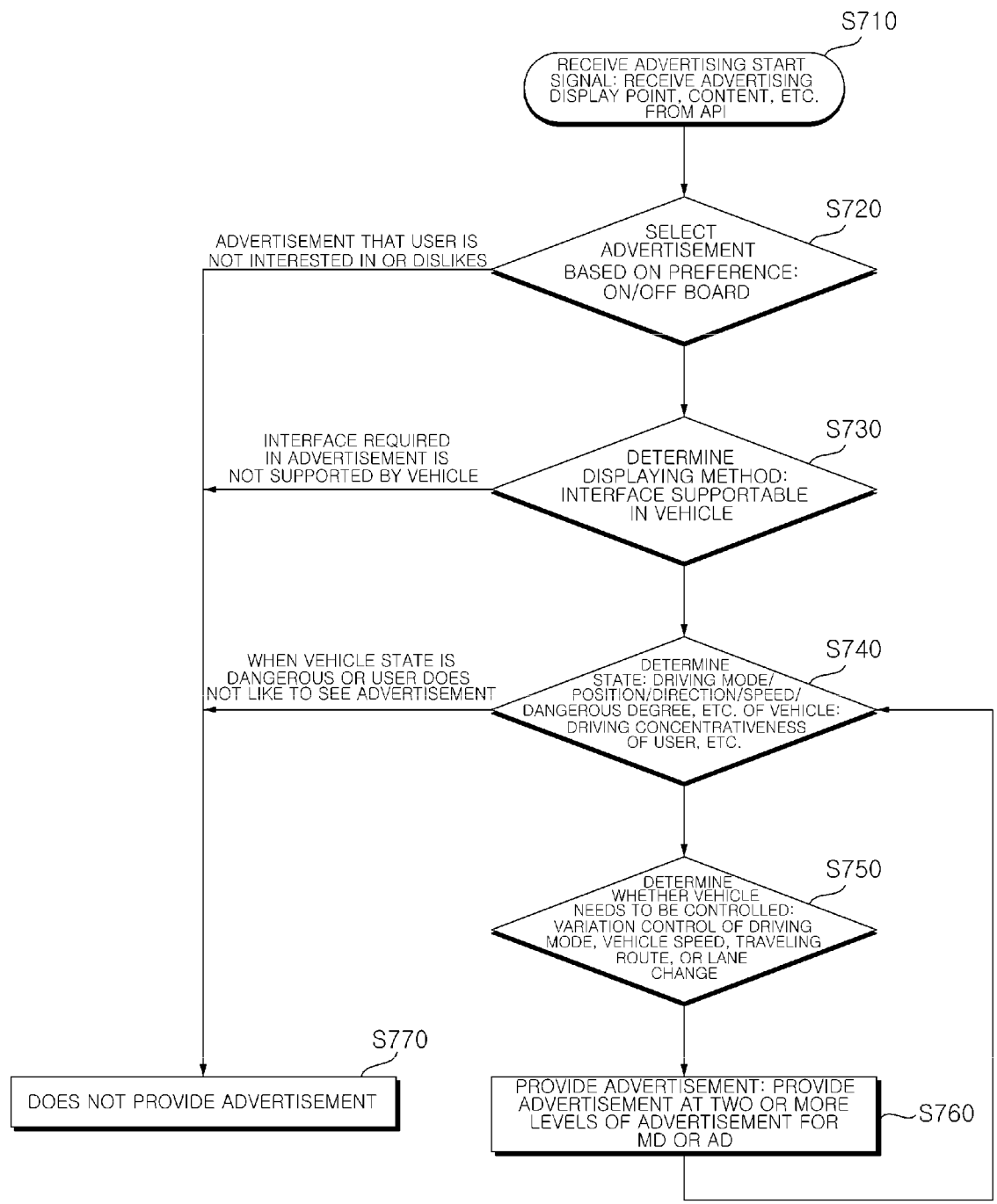
FIG. 7 is a flowchart of an advertisement providing device according to an embodiment of the present invention.

FIG. 7 is a flowchart of an advertisement providing device according to an embodiment of the present invention.

Referring to FIG. 7, the processor 170 may receive an advertising start signal (S710). The processor 170 may receive the advertising start signal from at least one server. The processor 170 may receive an advertising display point, advertising content, or the like from an application programming interface (API).

The processor 170 may determine whether an advertisement is output based on user preference (S720). For example, the processor 170 may select an advertisement with high user preference through an AI algorithm. The processor 170 may input an interest rate of the user with respect to accumulated and stored advertisements to the AI algorithm and may determine the user preference. The processor 170 may select an advertisement according to the user preference. Upon determining that the user is not interested in the advertisement or dislikes the advertisement based on the data, the processor 170 may not provide the advertisement (S770).

The processor 170 may determine a method of displaying an advertisement and may determine whether the advertisement is output (S730). The processor 170 may select any one of components included in the user interface device 200 as the method of displaying an advertisement. Upon determining that the vehicle 10 does not include an interface that requires an advertisement, the processor 170 may not provide an advertisement (S770).

The processor 170 may determine whether an advertisement is output based on the driving situation information (S740). The processor 170 may determine whether a state of the vehicle 10 is dangerous or the user does not like to see an advertisement, based on at least one of a driving mode, a location, a direction, speed, and a dangerous degree of the vehicle, or a driving concentrativeness of the user. Upon determining that the state of the vehicle 10 is dangerous or the user does not want to see the advertisement, the processor 170 may not provide the advertisement (S770).

The processor 170 may determine whether the vehicle 10 needs to be controlled (S750). Upon determining that the vehicle 10 needs to be controlled, the processor 170 may perform various control of a driving mode, a vehicle speed, a traveling route, a lane, or the like.

The processor 170 may provide an advertisement (S760). The advertisement may be classified into an advertisement for manual driving and an advertisement for autonomous driving.

The processor 170 may provide a signal for displaying imaginary AR signage at a predetermined place. The processor 170 may receive information on a displayed position, a size, content, or the like of the AR signage from various service providers. The processor 170 may match the display position of the AR signage on a map and may display the match result.

The processor 170 may display the AR signage on a display included in the vehicle based on data received from an object detection camera and data received from an internal camera for recognizing a driver gaze. The user may sense as if an outdoor advertising signboard while seeing the AR signage.

The processor 170 may set at least one of information of an advertisement, a displayed region, or a manipulation method of the AR signage to be different from the other, based on the driving state. The processor 170 may set at least one of information of an advertisement, a displayed region, or a manipulation method depending on whether a current mode is a manual driving mode or an autonomous driving mode. The processor 170 may set at least one of information of an advertisement, a displayed region, or a manipulation method of an advertisement according to a direction, a speed, a position coordinate, and a driving dangerous degree of the vehicle 10.

The processor 170 may determine information of an advertisement of AR signage appropriate for a driving state. For example, when the vehicle 10 travels in a manual driving mode, the processor 170 may select an advertisement for a manual driving mode. For example, when the processor 170 travels in an autonomous driving mode, the processor 170 may select an advertisement for an autonomous driving mode.

The processor 170 may determine a displayed region of the AR signage. The processor 170 may limit or extend the displayed region of the AR signage. For example, the processor 170 may output advertisement content including only voice. For example, the processor 170 may output AR signage in all directions.

The processor 170 may determine a manipulation method based on an advertisement. The processor 170 may limit or extend an interface to be used depending on a driving state. For example, the processor 170 may use only touch input. For example, the processor 170 may use gesture input or input via gaze recognition.

The processor 170 may control the vehicle 10 according to a reaction of the user with respect to an advertisement. The reaction of the user with respect to an advertisement may be classified into a reaction in which the user does not like see an advertisement, a reaction in which the user is interested in the advertisement, or a reaction in which the user manipulates an interface. The reaction of the user with respect to an advertisement may be determined based on a user image acquired from the internal camera. The processor 170 may provide a signal for at least one of a driving mode change, a traveling route change, or a lane change.

In a state in which the vehicle 10 travels in a manual driving mode, AR signage may be displayed. The processor 170 may provide a signal for displaying an AR signage for displaying a movie advertisement with high user preference in an empty space in the vicinity of the road. The vehicle 10 may be changed to the autonomous driving mode from the manual driving mode. The processor 170 may determine a reaction of the user with respect to the movie advertisement. Upon determining that the interest rate of the user is high, the processor 170 may provide a signal for converting a manual driving mode to an autonomous driving mode. The processor 170 may provide a signal for outputting movie content associated with the movie advertisement. In this case, the movie content may be output as AR. The processor 170 may provide a signal for setting a place associated with the movie advertisement as a destination.

The invention can also be embodied as computer readable code on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), ROM, RAM, CD-ROM, magnetic tapes, floppy disks, optical data storage devices, etc. and include a carrier wave (for example, a transmission over the Internet). In addition, the computer may include a processor or a controller. Accordingly, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed:

1. A vehicular advertisement providing device comprising:
a processor configured to receive data generated by at least one server, to generate augmented reality (AR) advertisement data that matches the outside of a road in which a vehicle travels based on the data, and to provide a first signal for displaying a first graphic object based on the advertisement data on at least one display included in the vehicle,
wherein the processor is configured to:
determine at least one of a display region of the first graphic object, a size of the first graphic object, content of the first graphic object, or a user interface method related to an advertisement, based on driving situation information,
receive user sensing data,
determine an interest rate of a user with respect to the first graphic object based on the user sensing data, and provide a second signal for displaying, on the at least one display, a second graphic object based on the interest rate.

2. The vehicular advertisement providing device of claim 1, wherein the processor is configured to provide a signal for displaying AR signage that matches the outside of the road in which the vehicle travels, to the at least one display, and provide a signal for displaying the first graphic object to the AR signage.

3. The vehicular advertisement providing device of claim 2, wherein the data generated by the at least one server includes information on a position that matches the AR signage; and
wherein the position is one point of the outside of the road in which the vehicle travels.

4. The vehicular advertisement providing device of claim 2, wherein the data generated by the at least one server includes at least one of information on a size of the AR signage, information on a time of displaying the AR signage, information on a position of displaying the AR signage, or information on displayed content of the AR signage.

5. The vehicular advertisement providing device of claim 2, wherein the processor is configured to provide a signal for displaying the AR signage to match an empty space of the outside of the road in which the vehicle travels or a structure, to the at least one display.

6. The vehicular advertisement providing device of claim 5, wherein the processor is configured to acquire information on a user gaze and provides a signal for displaying the AR signage at an intersection between the user gaze and the display in a state in which the user gaze is oriented toward the empty space or the structure.

7. The vehicular advertisement providing device of claim 1, wherein the processor is configured to receive information on an autonomous driving mode, and upon determining that the vehicle travels in an autonomous driving state, the processor is configured to provide a signal for displaying the first graphic object to be relatively large compared with a case in which the vehicle travels in a manual driving state.

8. The vehicular advertisement providing device of claim 1, wherein the processor is configured to receive information on an autonomous driving mode, and upon determining that the vehicle travels in an autonomous driving state, the processor is configured to provide a signal for displaying the first graphic object in a different form from a case in which the vehicle travels in a manual driving state.

9. The vehicular advertisement providing device of claim 1, wherein the processor is configured to receive information on an autonomous driving mode, and upon determining that the vehicle travels in an autonomous driving state, the processor is configured to provide a signal for implementing a user interface using a different method from a case in which the vehicle travels in a manual driving state.

10. The vehicular advertisement providing device of claim 1, wherein the processor is configured to provide a signal for control of at least one of conversion to an autonomous driving mode, vehicle steering, acceleration, or deceleration of the vehicle, based on the interest rate.

11. The vehicular advertisement providing device of claim 1, wherein the processor is configured to provide a signal for setting a destination associated with the advertisement data, based on the interest rate.

12. The vehicular advertisement providing device of claim 1, wherein the processor is configured to provide a signal for outputting content associated with the advertisement data, based on the interest rate.

13. A vehicular advertisement providing method comprising:
receiving data generated by at least one server, by at least one processor;
generating augmented reality (AR) advertisement data that matches the outside of a road in which a vehicle travels based on the data, by the at least one processor; and
providing a first signal for displaying a first graphic object based on the advertisement data on at least one display included in the vehicle, by the at least one processor, wherein providing the first signal for displaying the first graphic object includes:
receiving driving situation information, and
determining at least one of a display region of the first graphic object, a size of the first graphic object, content of the first graphic object, or a user interface method related to an advertisement, based on driving situation information;
receiving user sensing data;
determining an interest rate of a user with respect to the first graphic object based on the user sensing data; and
providing a second signal for displaying, on the at least one display, a second graphic object based on the interest rate.

14. The vehicular advertisement providing method of claim 13, wherein the providing the first signal includes:
providing a signal for displaying AR signage that matches the outside of the road in which the vehicle travels, to the at least one display, by the at least one processor; and
providing a signal for displaying the first graphic object to the AR signage, by the at least one processor.

15. The vehicular advertisement providing method of claim 14, wherein the data generated by the at least one server includes information on a position that matches the AR signage; and
wherein the position is one point of the outside of the road in which the vehicle travels.

16. The vehicular advertisement providing method of claim 14, wherein the data generated by the at least one server includes at least one of information on a size of the AR signage, information on a time of displaying the AR signage, information on a position of displaying the AR signage, or information on displayed content of the AR signage.

17. The vehicular advertisement providing method of claim 14, wherein the providing the signal includes providing a signal for displaying the AR signage to match an empty space of the outside of the road in which the vehicle travels or a structure, to the at least one display, by the at least one processor.

18. The vehicular advertisement providing method of claim 17, wherein the providing the signal includes:
acquiring information on a user gaze, by the at least one processor; and
providing a signal for displaying the AR signage at an intersection between the user gaze and the display in a state in which the user gaze is oriented toward the empty space or the structure, by the at least one processor.

* * * * *